US011518341B2

(12) United States Patent
Heinrich

(10) Patent No.: US 11,518,341 B2
(45) Date of Patent: Dec. 6, 2022

(54) METHOD FOR CONTROLLING A LOCKING ELEMENT OF A VEHICLE

(71) Applicant: Continental Automotive GmbH, Hannover (DE)

(72) Inventor: Alexander Heinrich, Hannover (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/493,662

(22) PCT Filed: Mar. 12, 2018

(86) PCT No.: PCT/EP2018/056019
§ 371 (c)(1),
(2) Date: Sep. 12, 2019

(87) PCT Pub. No.: WO2018/166944
PCT Pub. Date: Sep. 20, 2018

(65) Prior Publication Data
US 2020/0130644 A1 Apr. 30, 2020

(30) Foreign Application Priority Data
Mar. 13, 2017 (DE) .................... 10 2017 204 078.5

(51) Int. Cl.
*B60R 25/20* (2013.01)
*B60R 25/24* (2013.01)
(Continued)

(52) U.S. Cl.
CPC ........ *B60R 25/003* (2013.01); *B60R 25/2045* (2013.01); *B60R 25/241* (2013.01);
(Continued)

(58) Field of Classification Search
CPC . B60R 25/003; B60R 25/2045; B60R 25/241; B60R 25/257; B60R 25/305; B60R 25/302; B60R 25/24; E05B 81/64
See application file for complete search history.

(56) References Cited

U.S. PATENT DOCUMENTS 4,856,072 A * 8/1989 Schneider ........... B60R 16/0373
381/86
5,929,769 A * 7/1999 Garnault ............ G07C 9/00309
340/5.61
(Continued)

FOREIGN PATENT DOCUMENTS

CN 106043223 A 10/2016
DE 19937915 A1 3/2000
(Continued)

OTHER PUBLICATIONS

International Search Report and Written Opinion dated Jun. 7, 2018 from corresponding International Patent Application No. PCT/EP2018/056019.
(Continued)

*Primary Examiner* — Brian E Miller

(57) ABSTRACT

A method for controlling at least one locking element of a vehicle is disclosed. A mobile identification transmitter is detected at a position in a certain access region around the vehicle. Furthermore, a user signal is output to a user carrying the mobile identification transmitter after the mobile identification transmitter has stayed at the position for a first predetermined duration. In addition, the at least one locking element is unlocked/opened after the mobile identification transmitter further stays at the position for a second predetermined duration after the user signal is output. For the targeted control of the automatic unlocking or opening of the vehicle door, the process of unlocking or
(Continued)

opening is terminated if a termination signal from the user is detected within the second predetermined duration.

20 Claims, 4 Drawing Sheets

(51) Int. Cl.
*B60R 25/25* (2013.01)
*B60R 25/30* (2013.01)
*E05B 81/64* (2014.01)
*B60R 25/00* (2013.01)

(52) U.S. Cl.
CPC .......... *B60R 25/257* (2013.01); *B60R 25/305* (2013.01); *E05B 81/64* (2013.01); *B60R 25/302* (2013.01)

(56) References Cited

U.S. PATENT DOCUMENTS

| | | | |
|---|---|---|---|
| 7,180,454 B2* | 2/2007 | Asakura | B60R 25/245 343/713 |
| 8,091,280 B2 | 1/2012 | Hanzel et al. | |
| 8,744,482 B2* | 6/2014 | Margalef | G01S 5/0252 340/5.61 |
| 8,788,152 B2* | 7/2014 | Reimann | G07C 9/00658 701/49 |
| 8,935,052 B2* | 1/2015 | Hermann | B60R 25/20 701/45 |
| 9,156,439 B2* | 10/2015 | Hirota | B60R 25/246 |
| 9,162,685 B2* | 10/2015 | Schindler | B60W 50/08 |
| 9,205,806 B2* | 12/2015 | Günter | B60R 25/01 |
| 9,214,083 B2* | 12/2015 | Lim | G08C 17/02 |
| 9,243,441 B2* | 1/2016 | Gupta | E05F 15/77 |
| 9,283,905 B2* | 3/2016 | Herthan | B60R 25/2045 |
| 9,573,565 B2* | 2/2017 | Schindler | B60R 25/245 |
| 9,587,417 B2* | 3/2017 | Van Gastel | E05F 15/73 |
| 9,598,049 B2* | 3/2017 | Sherony | G07C 9/257 |
| 9,605,471 B2* | 3/2017 | Salter | B60J 5/101 |
| 9,689,982 B2* | 6/2017 | Herthan | E05B 81/76 |
| 9,739,082 B2* | 8/2017 | Krauss | B60R 25/2054 |
| 9,760,698 B2* | 9/2017 | Pisz | H04W 4/80 |
| 9,799,152 B2* | 10/2017 | Kamisawa | E05F 15/77 |
| 9,858,735 B2* | 1/2018 | Spahl | H04W 52/02 |
| 9,963,107 B2* | 5/2018 | Murar | B60R 25/24 |
| 9,972,150 B2* | 5/2018 | Da Deppo | G07C 9/28 |
| 10,053,903 B2* | 8/2018 | Ette | B60R 25/2054 |
| 10,176,368 B1* | 1/2019 | Ramakrishnan | E05F 15/73 |
| 10,196,037 B2* | 2/2019 | Nicholls | B60R 25/2054 |
| 10,315,623 B2* | 6/2019 | Iwashita | B60R 25/245 |
| 10,384,641 B2* | 8/2019 | McNabb | B60R 25/245 |
| 10,435,924 B1* | 10/2019 | Salter | B60R 25/24 |
| 10,443,290 B2* | 10/2019 | Tokudome | B60R 25/2036 |
| 10,466,772 B2* | 11/2019 | Trotta | B60R 16/037 |
| 10,510,200 B2* | 12/2019 | Kim | B60R 25/245 |
| 10,515,499 B2* | 12/2019 | Kim | B60R 25/245 |
| 10,774,575 B2* | 9/2020 | Spangler | B60N 2/3011 |
| 10,794,107 B2* | 10/2020 | Salter | B60R 25/24 |
| 2003/0020603 A1* | 1/2003 | DeLine | B60R 1/12 340/425.5 |
| 2006/0057956 A1* | 3/2006 | Grau | H04H 20/74 455/3.02 |
| 2006/0074651 A1* | 4/2006 | Arun | G10L 15/22 704/233 |
| 2007/0200672 A1* | 8/2007 | McBride | B60R 25/245 340/5.72 |
| 2008/0061932 A1* | 3/2008 | Hermann | B60R 25/24 340/5.72 |
| 2011/0218709 A1* | 9/2011 | Hermann | B60R 25/24 701/45 |
| 2011/0242303 A1 | 10/2011 | Giraud et al. | |
| 2012/0050021 A1* | 3/2012 | Rao | B60N 2/28 340/425.5 |
| 2012/0158253 A1* | 6/2012 | Kroemke | E05F 15/70 701/49 |
| 2013/0026529 A1 | 1/2013 | Tsang | |
| 2013/0079985 A1* | 3/2013 | Wolf | E05B 77/54 701/36 |
| 2013/0154928 A1* | 6/2013 | Chang | G06F 3/017 345/157 |
| 2013/0234733 A1* | 9/2013 | Lange | B60R 25/246 324/658 |
| 2014/0285217 A1* | 9/2014 | Van Gastel | H03K 17/955 324/658 |
| 2014/0309879 A1* | 10/2014 | Ricci | G06Q 20/321 701/36 |
| 2014/0310075 A1* | 10/2014 | Ricci | G06K 9/00268 705/13 |
| 2014/0354402 A1* | 12/2014 | Joao | H04L 63/08 340/5.52 |
| 2014/0371912 A1* | 12/2014 | Passot | G06N 3/008 700/264 |
| 2015/0009062 A1* | 1/2015 | Herthan | G01S 7/415 342/70 |
| 2015/0012176 A1 | 1/2015 | Schindler et al. | |
| 2015/0291126 A1* | 10/2015 | Nicholls | G07C 9/00309 701/49 |
| 2016/0159321 A1* | 6/2016 | Lagabe | B60R 25/31 701/2 |
| 2016/0212522 A1* | 7/2016 | Lee | B60W 50/14 |
| 2016/0281410 A1* | 9/2016 | Schanz | E05B 81/16 |
| 2017/0066407 A1 | 3/2017 | Ette | |
| 2017/0103594 A1 | 4/2017 | Kim et al. | |
| 2017/0152697 A1* | 6/2017 | Dehelean | E05F 15/73 |
| 2017/0204650 A1* | 7/2017 | Dezorzi | B60R 25/2054 |
| 2017/0232932 A1* | 8/2017 | Nishidai | B60R 25/2054 340/5.61 |
| 2018/0118161 A1* | 5/2018 | Ette | B60R 25/2054 |
| 2018/0170309 A1* | 6/2018 | McMahon | B60Q 1/50 |
| 2018/0187460 A1* | 7/2018 | Gordon | B60R 21/0136 |
| 2018/0208204 A1* | 7/2018 | Chen | G06F 1/1694 |
| 2018/0290627 A1* | 10/2018 | Hariri | B60R 25/245 |
| 2018/0313133 A1* | 11/2018 | Goldmann | E05F 15/76 |
| 2019/0011993 A1* | 1/2019 | Ette | G09G 3/2092 |
| 2019/0071055 A1* | 3/2019 | Luchner | G07C 9/00563 |
| 2019/0118770 A1* | 4/2019 | Rausch | G07C 9/00174 |
| 2019/0392664 A1* | 12/2019 | Determann | H04W 4/80 |
| 2020/0130644 A1* | 4/2020 | Heinrich | B60R 25/003 |
| 2020/0216023 A1* | 7/2020 | Sobecki | B60R 25/2054 |
| 2020/0349786 A1* | 11/2020 | Ho | G06K 9/00288 |
| 2021/0183499 A1* | 6/2021 | Barkan | G06F 40/169 |

FOREIGN PATENT DOCUMENTS

| | | |
|---|---|---|
| DE | 10106400 A1 | 8/2002 |
| DE | 102006015930 A1 | 12/2006 |
| DE | 102006037237 A1 | 2/2008 |
| DE | 102009040395 A1 | 4/2011 |
| DE | 102011111600 A1 | 2/2013 |
| DE | 102014204914 A1 | 9/2015 |
| EP | 1733937 A1 | 12/2006 |
| EP | 2183453 A1 | 5/2010 |
| EP | 2821296 A1 | 1/2015 |
| JP | 4793118 B2 | 10/2011 |

OTHER PUBLICATIONS

Office Action dated Jan. 4, 2022 from corresponding Chinese patent application No. 201880015854.3.

* cited by examiner

METHOD FOR CONTROLLING A LOCKING ELEMENT OF A VEHICLE

The present invention relates to a method for controlling at least one locking element, such as a door of a vehicle, and an access arrangement for vehicle, particularly for controlling the at least one locking element of the vehicle. Furthermore, the invention comprises a vehicle having the access arrangement which was just mentioned.

In order to prevent unauthorized access to a vehicle, particularly a motor vehicle, modern access authorization systems or access arrangements in vehicles use electronic security systems, in which to identify a user data communication takes place between a first communication device of the vehicle and a second communication device in a mobile identification transmitter of the user, such as a key or a key fob. In this case, in an active access arrangement of the mobile identification transmitter, control signals and an identification signal are transmitted to the vehicle, for example by the user of the mobile identification transmitter pressing a corresponding button, whereupon this vehicle is unlocked or locked if the identification code is correct.

In what is known as a passive access arrangement, inquiry signals with a certain field strength are initially sent out at regular time intervals by a first communication device of the vehicle, in order to check whether a mobile identification transmitter is located in a proximity region or in an access region (unlock zone) around the vehicle. If a mobile identification transmitter approaches the vehicle and can ultimately receive the inquiry signals thereof (the mobile identification transmitter is then in the proximity region), then the mobile identification transmitter will respond to receiving an enquiry signal in order to start an authentication process. In this case, data telegrams are exchanged, in which the mobile identification transmitter ultimately transmits its authentication code to the vehicle. If the authentication code is checked successfully, it is then possible that a user, who is located directly at the vehicle in the access region, initiates unlocking of the corresponding vehicle door or all vehicle doors by actuating a door handle. As no active actuation of a mechanical or electrical identification transmitter or key by a user has to take place here, this type of access authorization checking is also termed passive access authorization checking and the corresponding access authorization systems are termed passive electronic access authorization systems or a passive access arrangement.

The disadvantage of a method of this type for attaining access to a vehicle is revealed to be that a user who is located in the vehicle first has to actuate a door handle to attain access to the vehicle. This may be inconvenient in particular if a user has just returned to the vehicle from shopping and is carrying a number of shopping items or bags with them, so that they scarcely have a hand free or do not have a hand free at all, in order to actuate the door handle.

The object of the present invention is therefore to create a reliable and efficient possible way of accessing a vehicle, which offers a user more convenience.

This object is achieved by the subjects of the independent claims. Advantageous configurations are the subject matter of the dependent claims.

In this case, a method for controlling at least one locking element of a vehicle, particularly a motor vehicle, comprises the following steps according to a first aspect of the invention. A mobile identification transmitter is detected at a position in a certain access region around the vehicle. Furthermore, the time is measured for which a user carrying the mobile identification transmitter stays at the position. A user signal is output to the user after the user has stayed at the position for a output first predetermined duration. Furthermore, the time is determined for which the user stays at the position after the user signal is output. Unlocking/opening of the at least one locking element is then carried out after the mobile identification transmitter further stays at the position for a second predetermined duration after the user signal is output. Finally, a termination of the process of unlocking and/or opening the at least one locking element is carried out if a termination signal of the user is detected within the second predetermined duration (after the user signal is output). In this manner, firstly, a control method with increased convenience for the user is created, as unlocking or opening of the at least one locking element takes place automatically after the second predetermined duration has elapsed if the user stays at their position. Secondly, the user can control the process of unlocking and/or opening in a targeted manner in that they can also terminate this process again if they send out a corresponding termination signal after receipt of the user signal.

The locking element may be an element which separates the vehicle interior, such as the passenger compartment and/or the trunk, from the vehicle surroundings, but can be opened, in order to bring people or items into the vehicle interior or fetch people or items therefrom, and can also be closed again. In this case, a locking element may comprise a vehicle door, a trunk lid or a tailgate, etc.

It is noted that the above method can be applied in particular in the case in which the locking element of the vehicle is locked or closed, so that unlocking and/or opening can be achieved by means of the method. However, it is also possible that the locking element is in an unlocked and possibly even opened state. In such a case, it is conceivable that then (instead of unlocking/opening) automatic locking and/or closing of the at least one locking element takes place after the second predetermined duration has elapsed. A further function for increasing the security of the vehicle against theft and the convenience for the user is created in this manner.

According to a configuration of the method, the location of the mobile identification transmitter with respect to the vehicle is determined after the termination of the process of unlocking and/or opening. In this context, it is conceivable that in the event that the location of the mobile identification transmitter is furthermore determined in the certain access region at a position, after the termination of the process of unlocking and/or opening, the method again begins to measure the time for which the user stays at the position, and correspondingly a user signal is output after the user has stayed at the position for a first predetermined duration. As described above, a corresponding (automatic) unlocking and/or opening of the at least one locking element or a termination of the process can then take place in accordance with the aforementioned model.

According to a further configuration of the method, it is further conceivable that the location of the mobile identification transmitter with respect to the vehicle is determined after the termination of the process of unlocking and/or opening. The repeated continuation of the measurement of a time when the identification transmitter stays at a position in the access region (and the check of whether the first predetermined duration is reached) may also be linked to a condition, however. Thus, it is conceivable that the condition consists in that the mobile identification transmitter is initially detected outside of the access region (that is to say not inside the access region) and is then detected again inside the access region. After carrying out a movement of this type of the mobile identification transmitter (away from the vehicle and then back in the direction toward the vehicle, as it were), the measurement of the time is begun again upon detection of the mobile identification transmitter in the access region, in order to check whether the identification transmitter or the user is located at the position inside the access region for the first predetermined duration. In this manner, a secure possibility is created both for the vehicle and for the user of unlocking or opening the vehicle if there is an actual conscious desire of the user for that. In other words, an accidental opening or unlocking can be prevented as a result.

According to a configuration, the termination signal of the user may comprise a movement away from the position inside the certain access region. The movement away may in this case comprise a movement away from the position to a different position inside the certain access region, but this may however also be a movement away to a position outside the access region. Particularly for a user who is carrying a plurality of shopping items with them, a movement may constitute a termination signal which is simple to carry out.

According to a configuration, it is also conceivable that a termination signal constitutes a biometric signal. For example, a user may carry out a characteristic movement of a body part, such as a characteristic hand movement or arm movement, as a termination signal. In addition, it is conceivable that a user moves their head in a predetermined manner (such as rotation once or multiple times to the left and right). In addition, it is conceivable that a user sends out an acoustic signal. In this case, firstly, the frequency profile or speech profile of the user may be analyzed and only a predetermined frequency profile or speech profile may be called upon as termination signal. It is also conceivable that the user outputs a certain word (such as "STOP") or a certain sound which may be used as termination signal. All of these ways give simple options for effecting a termination signal and thus a secure control of the locking element.

According to a further configuration, it is also conceivable to carry out an authentication of the mobile identification transmitter at the vehicle, in order to check that the mobile identification transmitter belongs to the vehicle. It is also conceivable that the authentication is carried out prior to measuring the stay of the mobile identification transmitter at a position inside the predetermined access region, and the measurement of the time for which the identification transmitter is located at the position inside the access region is only started in the event of a positive result (if the identification transmitter is classed as belonging to the vehicle).

In this case, the identification transmitter may for example be an electronic key assigned to the vehicle, or a key fob. However, it is conceivable that other items which can be carried by a user may be used as a mobile identification transmitter, such as for example a watch, a fitness bracelet, a mobile telephone (smartphone) or smartglasses.

According to a further aspect of the invention, an access arrangement for a vehicle with the following features is created. It has a location device for detecting a mobile identification transmitter at a position in a certain access region around the vehicle. Furthermore, it has an output device for outputting a user signal to a user carrying the mobile identification transmitter after the mobile identification transmitter has stayed at the position for a first predetermined duration. In addition, it has a control device for unlocking and/or opening the at least one locking element after the mobile identification transmitter further stays at the position for a second predetermined duration after the user signal is output. In addition, the access arrangement has a detection device for detecting a termination signal of a user.

Furthermore, a control device is set up so as to terminate the process of unlocking and/or opening if a termination signal from the user is detected within the second duration (after outputting the user signal). In this manner, on the one hand a convenient option is created for automatically effecting unlocking or opening if the user stands for a certain time at a certain position at the vehicle, but a targeted control of the locking element and thus improved security are also achieved in that a possibly undesired process of unlocking and/or opening can also consciously be terminated again by the user.

According to a configuration of the method, the detection device comprises a movement detection device, which is set up for detecting a movement away of the user from the position or for detecting a certain movement of a body part of a user as a termination signal.

Furthermore, it is conceivable that the movement device comprises a camera, in which a movement of the user or a body part of the user can be recognized on the basis of analysis of a plurality of temporally sequentially recorded images.

Furthermore, it is conceivable that the detection device comprises a microphone for detecting an acoustic signal of the user as a termination signal. In this case, a certain word or a certain sound, which the microphone detects and passes to the control device, may be used as a termination signal.

Both with reference to the method and to the access arrangement, the user signal may be an optical user signal, which is carried out for example by activating vehicle lighting in accordance with a predetermined pattern (e.g. short flashing). Furthermore, the user signal may comprise an acoustic signal on the part of the vehicle (e.g. short sounding of the horn) or a combined optical and acoustic signal. It is also possible however that the user signal is output to the user by the mobile identification transmitter itself. In this case, the user signal can again also be output optically (e.g. by means of a light-emitting diode in the mobile identification transmitter or a specific display element), acoustically (e.g. by means of a loudspeaker) or mechanically (e.g. by means of a vibration element). Also, a combination of two or more of the features mentioned is again conceivable as user signal on the part of the identification transmitter. In addition, it is possible that a request signal is transmitted from the vehicle to the mobile identification transmitter (if the first predetermined duration has been measured, particularly after a successful authentication), so that the mobile identification transmitter can then output the user signal.

Both in the method and in the access arrangement, it is conceivable that the detection of the position of the mobile identification transmitter or the movement thereof takes place in that on the vehicle side, a plurality of signals are emitted with a predetermined intensity as inquiry signals (by the location device), for example in predetermined time intervals of 250 ms (ms: milliseconds), the intensity value or RSSI (RSSI: Received Signal Strength Indication) value of a respective inquiry signal is determined by the above identification transmitter at the location of the mobile identification transmitter and the determined intensity value of a respective inquiry signal is transmitted to the vehicle in order to determine the distance to the vehicle on the basis of the signal and, in the case of a plurality of spaced antennas on the vehicle emitting request signals, to determine the position or the movement of the mobile identification transmitter. It is conceivable that a movement of the mobile identification transmitter is only recognized in the event of a change above a certain difference or a certain difference threshold value as a movement. On the other hand, standing still or staying at a location can be detected on the basis of no change or a change below the certain difference threshold value.

The detection of staying at the position (inside the predetermined access region) can for example also take place by means of an optical sensor such as an optical camera and subsequent image analysis by observing or tracking the user assigned to the mobile identification transmitter. In other words, a camera records a plurality of images of a scene with the user and an analysis device (for example in the control device) compares a displacement or a change in size of the user in the respective images. Thus it is possible to draw a conclusion about staying at a position or about a movement of the user who is assigned to the mobile identification transmitter.

However, staying at a certain location can also be detected in that a movement sensor is provided in the mobile identification transmitter for example. In this case, the mobile identification transmitter can transmit the state of the movement sensor to the vehicle or the control device at regular time intervals, so that the control device detects staying or standing still of the user assigned to the mobile identification transmitter. It is conceivable for position determination to use a satellite-aided system based on runtime measurement, such as a GPS (Global Positioning System). In addition, it is conceivable, for precise position determination and thus also for detection of standing still, to use what is known as a UWB (ultrawide band) system, which is based on runtime measurement of a very short radio signal between two objects.

According to a further aspect of the invention, a vehicle having an aforementioned access arrangement or a configuration thereof is created.

Details and advantageous configurations of the above-described method, in so far as they can otherwise be transferred to the access arrangement or the vehicle, can also be seen as advantageous configurations of the access arrangement or vehicle and vice versa.

Exemplary embodiments of the present invention will now be explained in more detail below with reference to the accompanying drawings. In the drawings.

Figure 1:
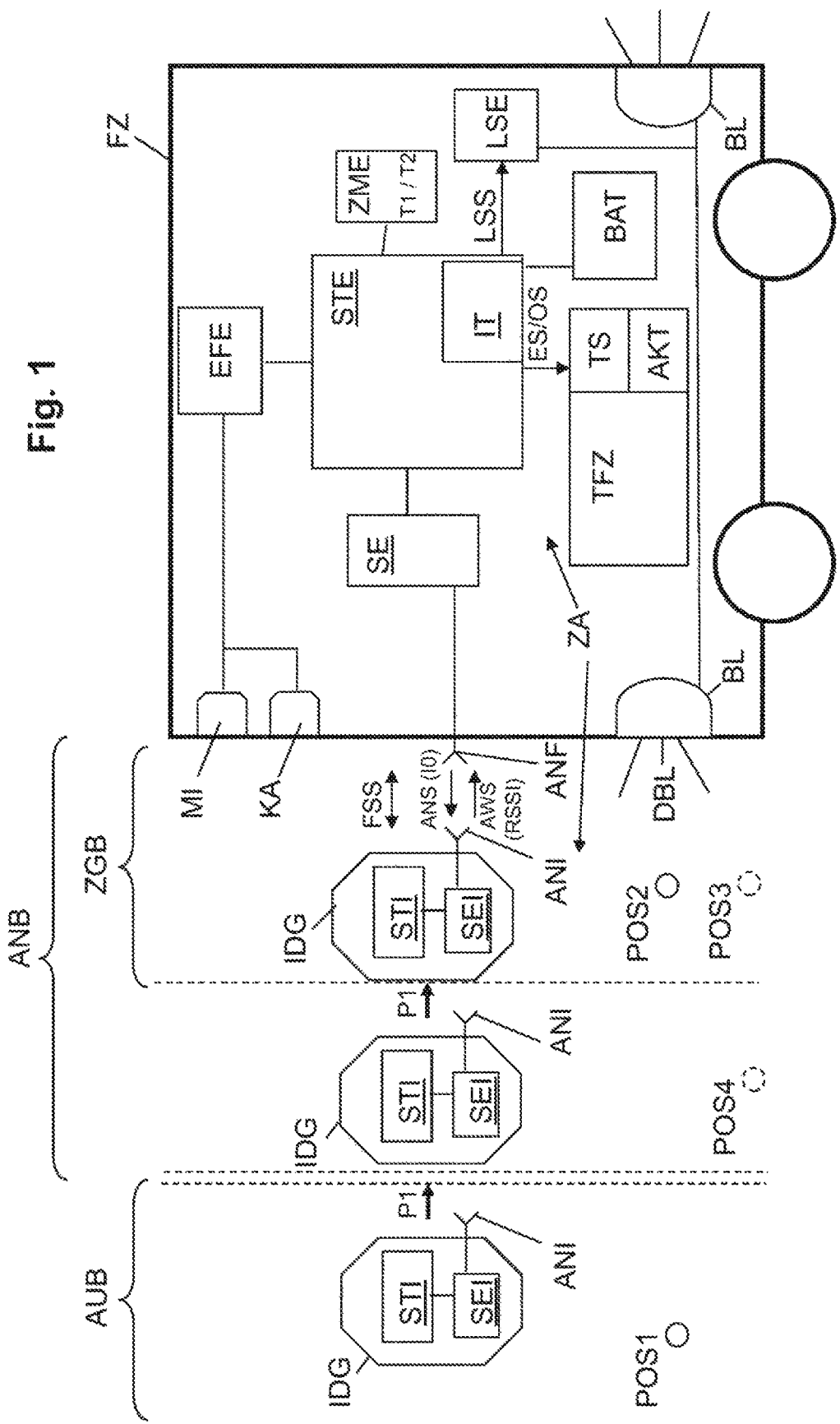
FIG. 1 shows a schematic illustration of a vehicle having an access arrangement according to an embodiment of the invention.

Reference is first made to FIG. 1, in which an access authorization system or an access arrangement ZA is shown, which is designed for use in a vehicle, here the motor vehicle FZ. In this case, the access arrangement ZA comprises a vehicle-side control device STE (in a vehicle-side region, compare right side of FIG. 1), which is supplied with power by a battery BAT. Although it is not illustrated, the battery BAT also supplies further components of the vehicle with power. The control device STE is connected to a vehicle-side transmission/receiving device SE, which is able, by means of a vehicle-side antenna ANF, to communicate via a radio link FNS with a mobile identification transmitter IDG (which will be explained in more detail later). Of course, it is also conceivable that, in addition to the one vehicle-side antenna ANF illustrated, a plurality of vehicle-side antennas ANF may be provided, in order for example to determine a precise position of the identification transmitter IGG around the vehicle by means of a triangulation method, as will be explained in more detail later.

Furthermore, the control device STE is connected to a door lock TS, which may for example be a part of a central locking system or for example may represent the same, in order to control the door lock by means of an unlocking signal ES or opening signal OS. The door lock is here assigned to a vehicle door or door TFZ as a locking element of the vehicle FZ, in order to unlock or even open the door TFZ depending on the received signal ES or OS. To open the door, the access arrangement ZA has an actuating device or an actuator AKT, which for example comprises a spring element (which is in a prestressed state in a closed state of the door and opens the door during unlocking) or a motor, such as an electric motor, for autonomous opening of the door.

In addition, the control device STE is connected to a lighting control device LSE, wherein the lighting control device LSE is able, after the receipt of a lighting control signal LSS, to activate or deactivate a lighting device BL (two devices in the image, one at the front and one at the back of the vehicle), here for example in the form of indicators.

As has been described above, the vehicle FZ will communicate via the radio link FSS with a mobile identification transmitter (in an identification-transmitter-side region of the access arrangement, cf. left side of FIG. 1) IDG. A prerequisite for this is that the mobile identification transmitter IDG is located in a proximity region ANB, in which signals (inquiry signals ANS) emitted by the vehicle-side antenna ANF still have sufficient field strength in order to be received properly by the mobile identification transmitter IDG. For the receipt of signals of the vehicle-side antenna ANF, a mobile identification transmitter IDG has an identification-transmitter-side antenna ANI, which is connected to an identification-transmitter-side transmitting/receiving device SEI, in order to process the received signals or to generate new signals, which can finally be emitted via the antenna ANI.

An identification-transmitter-side control device STI is connected to the identification-transmitter-side transmitting/receiving device SEI, which is responsible on the one hand for carrying out an authentication process with the vehicle FZ, but also for intensity determination or distance determination (and thus location determination or movement determination) from the mobile identification transmitter IDG to the vehicle FZ, as will be explained in more detail below. As is further additionally explained, the mobile identification transmitter IDG is illustrated in FIG. 1 at two positions POS1 and POS2 (by means of solid-line circles), wherein it may also assume a position POS3 or a position POS4 (possible positions labeled by means of dashed circles). The position POS3 is here likewise placed in the access region ZGB, the region next to the vehicle, whilst the position POS4 is further removed from the vehicle FZ, but is still located in the proximity region ANB.

In the first position POS1, the mobile identification transmitter is located outside of the proximity region ANB, namely in an external region AUB around the vehicle FZ and does not communicate with the vehicle F2 via the radio link FSS. By contrast, if the mobile identification transmitter IDG moves with its user or the vehicle user along the arrow P1 toward the vehicle, then it will reach the proximity region ANB (labeled by means of a double vertical dashed line), in order to establish contact with the vehicle FZ or to respond to inquiry signals ANS of the vehicle FZ. If the mobile identification transmitter IDG finally moves further toward the vehicle along the arrow P1, then it will come into a part of the proximity region ANB located close to the vehicle, namely into the access region, which is located directly at the vehicle FZ.

Figure 4:
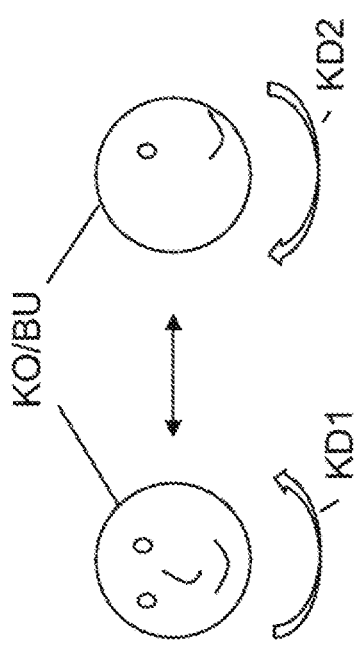
FIG. 4 shows a schematic illustration of a possible termination signal of a user according to a first configuration.

Before a procedure for operating the access arrangement ZA for unlocking or opening the vehicle door, particularly the trunk lid TFZ, is explained now on the basis of FIG. 4, also covered briefly is the course of the intensity of the inquiry signals ANS emitted by the antenna ANF at the location of the mobile identification transmitter IDG during a movement of the identification transmitter IDG.

Starting from the location or the position POS1, in which the mobile identification transmitter IDG is still located outside of the proximity region ANB, a change of the intensity of signals ANS is to be expected, which signals are received at the current whereabouts of the mobile identification transmitter IDG, if this mobile identification transmitter IDG moves inside the proximity region to the vehicle. On the basis of the detected intensity curve, a movement direction (toward the vehicle or away from the vehicle) or a movement speed or else a duration of stay at a certain position or without a certain region can therefore be determined.

Whilst at the above-mentioned location or position POS1, no or only a very low intensity of the vehicle-side inquiry signals (ANS) is determined, it will increase in a detectable manner from the boundary of the proximity region (ANB) in the direction of a location closer to the vehicle. In the proximity region, certain intensity threshold values can then be determined and defined, which then allow a determination of the zone or region in which, inside the proximity region, the mobile identification transmitter IDG is located. If the intensity of vehicle-side inquiry signals determined at the location of the mobile identification transmitter IDG is below a first threshold valve, then it may be defined that the mobile identification transmitter IDG is located in the external zone AUB. However, if the determined intensity is above a second threshold (which is larger than the first threshold), then the mobile identification transmitter IDG is, by definition, in the access region ZGB.

The transmitting/receiving device SE can therefore exert the function of a location device for determining the distance or else location of the mobile identification transmitter IDG with respect to the vehicle FZ.

Figure 2:
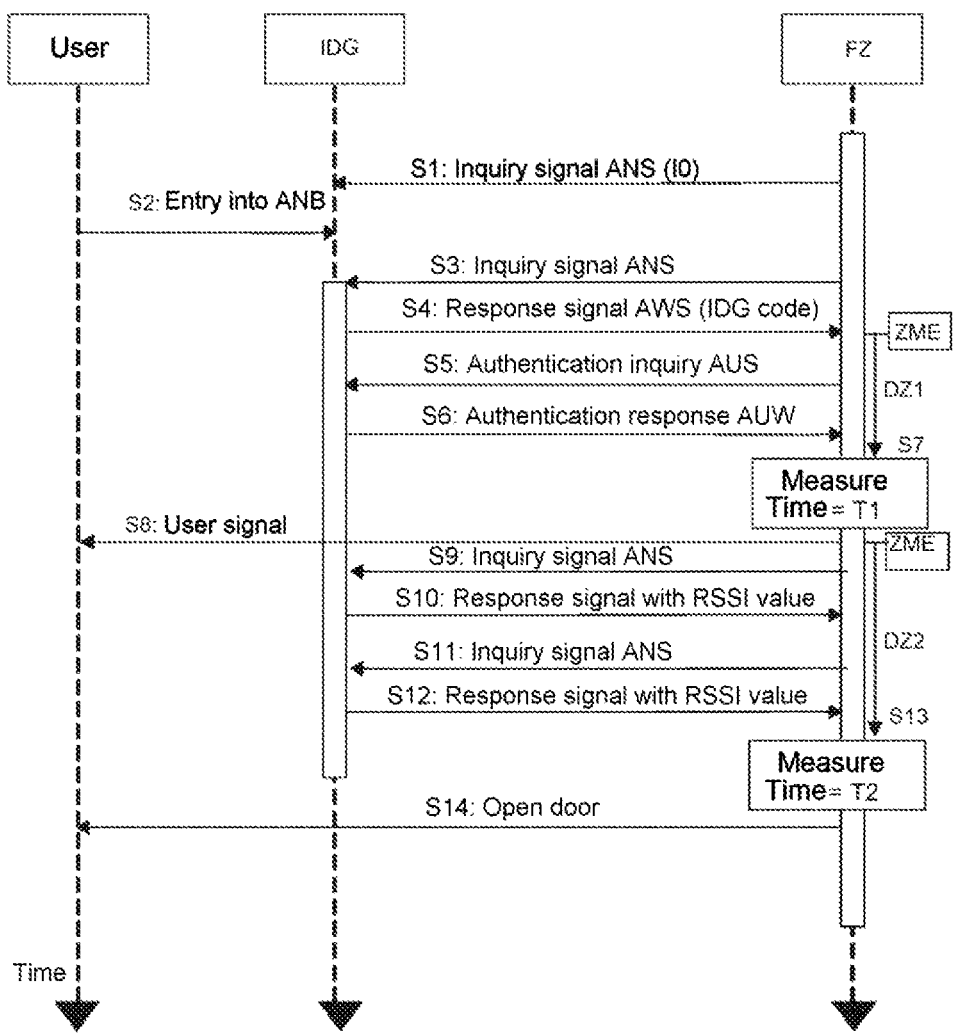
FIG. 2 shows a flow chart for illustrating the operation of an access arrangement for the control of at least one locking element in the form of a vehicle door for unlocking/opening the vehicle door according to an embodiment of the invention.

Now, finally, reference is made to FIG. 2, in which a flow chart for the detailed illustration of the operation of the access arrangement ZA for unlocking or opening of the vehicle door TFZ (actually the trunk lid) is shown. If the vehicle FZ is in a switched-off or parked state, then according to step S1, it will send out inquiry signals ANS at regular intervals or at certain times at a certain field strength I0. Mobile identification transmitters, such as the identification transmitter IDG, can detect these signals properly if they are located within the proximity region ANB, as is illustrated in FIG. 1. Initially, however, it is assumed that the mobile identification transmitter IDG is still located at the position POS1 (outside the proximity region ANB).

Then a user with their mobile identification transmitter IDG moves along the arrow P1 (FIG. 1) toward the vehicle FZ, advances in step S2 into the proximity region ANB and stops there at the position POS2 in the access region ZGB.

If a further inquiry signal ANS is then sent out in step S3 by the vehicle FZ or the vehicle-side transmitting/receiving device SE via the antenna ANF, then the mobile identification transmitter IDG can receive this signal and will send back a corresponding response signal AWS in step S4. In this case, a short code or an identification-transmitter identification can be contained in the response signal AWS. The response signal AWS emitted by the mobile identification transmitter IDG (or the control device STI, the transmitting/receiving device SEI and the antenna ANI) is finally received by the antenna ANF and forwarded via the transmitting/receiving device SE to the control device STE in the vehicle.

Then a thorough authentication begins in step S5, wherein the vehicle FZ initially transmits an authentication inquiry AUS via the corresponding devices SE or ANF to the mobile identification transmitter IDG. In step S6, the mobile identification transmitter IDG responds in that a response signal AUW generated by the control device STE is sent back with an authentication code to the vehicle. Here, the response signal AUW is received and forwarded to the control device STE. The control device checks the authentication code in that it compares the authentication code with a previously saved target authentication code.

If the authentication code is correct, then the transmitting/receiving device SE will emit further inquiry signals ANS with a predetermined field strength I0 via the antenna ANF at regular time intervals, such as for example time intervals of 250 ms. The purpose of the emission of the inquiry signals ANS with a predetermined field strength is that a mobile identification transmitter IDG located in the proximity region ANB measures the field strength or intensity of the inquiry signals at their current whereabouts and sends the, for example digitized, intensity value or RSSI (Received Signal Strength Indication) value to the vehicle. An RSSI value received via the antenna ANF and the vehicle-side transmitting/receiving device SE is finally forwarded to the control device STE, so that the same determines the distance of the identification transmitter IDG from the antenna ANF or from the vehicle in the function of an analysis device on the basis of the known field strength I0 with which the inquiry signals are emitted, and on the basis of the intensity of the inquiry signals measured by the identification transmitter IDG at the current whereabouts of the identification transmitter IDG. As mentioned previously, this can take place in time intervals of approx. 250 ms, so that a movement of the mobile identification transmitter can be determined on the basis of a detected intensity change over time.

As can be seen in FIG. 2, a time-measuring device ZME of the vehicle begins the measurement of a duration DZ1 from the arrival of the response signal AWS with the identification-transmitter-side code according to step S4. This time measurement runs parallel to the following just illustrated steps S5 and S6 and during the regular sending out of inquiry signals ANS and the receipt of response signals for a position determination of the mobile identification transmitter IDG. If no movement of the identification transmitter IDG is detected since the time of the arrival of the response signal AWS according to step S4, then it is possible to conclude that the identification transmitter is standing still or staying at the position thereof, particularly at the position POS2 inside the access region.

If, on the one hand, the vehicle-side control device STE determines that the mobile identification transmitter has already stayed for a longer time at the position POS2, then it will check in step S7 whether this duration of stay has already lasted for a first predetermined duration T1.

If this is the case, then according to step S8, a user signal is output on the part of the vehicle. This is triggered in that the vehicle-side control device STE receives a trigger from the time-measuring device ZME that the mobile identification transmitter IDG has meanwhile already stayed at the same position for the first predetermined duration T1, so that the vehicle-side control device STE emits a lighting control signal LSS to the lighting control device LSE, so that the same causes the vehicle-side lighting device BL to carry out a certain flashing pattern (for example rapid double flashing DBL).

With triggering of the user signal (the double flashing DBL), firstly the time-measuring device ZME is activated again to measure a further time interval DZ2. In addition, the transmitting/receiving device SE is again caused to send out inquiry signals ANS at regular time intervals according to steps S9 and S11, the RSSI value of which is then determined in the mobile identification transmitter IDG and, according to steps S10 and S12, sent back to the vehicle FZ again. In this manner, it is possible to check the position of the mobile identification transmitter at predetermined time intervals and a movement of the identification transmitter can be determined.

According to the example of FIG. 2, it is then assumed that the mobile identification transmitter has not moved from the position (the position POS2), but it is determined by the time-measuring device ZME in step S13 that a second predetermined time interval T2 has elapsed in the meantime. No termination signal of a user was detected within this time interval, so that then according to step S14, the vehicle-side control device STE sends out a corresponding control signal to the door locking device or the door lock TS. In this case, according to a first alternative, there is the option that the control device STE sends out an unlocking signal ES to the door lock TS, using which only the trunk lid is unlocked, so that it can be opened by means of the manual actuation of a specific button or a specific knob. Furthermore, according to a second alternative, the control device can transmit an unlocking signal ES and an opening signal OS to the door lock, so that initially the trunk lid is unlocked and opened for example by the actuator AKT. In this case, a user assigned to the mobile identification transmitter IDG can place shopping items directly into the trunk space for example without having to actuate a specific button or specific knobs. This brings great convenience for the user.

It is noted that the alternative "unlocking" or the alternative "opening" can also be controlled consciously by a user. For example, it is conceivable that after the duration T2 mentioned, the door or the trunk lid is initially only unlocked. However, if the user also stays at their position for a predetermined third duration from the unlocking of the trunk and does not output a termination signal, then it is conceivable that the vehicle-side control device STE also still opens the door or trunk lid.

In this case, the first, second and third durations may lie in a range from 1 to 2 seconds.

In addition to the just described option of opening a vehicle door, such as the trunk lid, as locking element, if an identification transmitter stays for a predetermined first, second or third duration, then it is also conceivable, carrying out the corresponding method in a vehicle with unlocked or opened door, that closing the door and/or locking the door here takes place after the user stays at a position inside the access region. In order to achieve secure closing and/or locking of the door, which is actually desired by a user, a switch (such as a pushbutton switch) may be provided according to a configuration of the method in or on the vehicle, which switch is initially to be actuated by a user if the user has the desire for an automatic closing or locking of a door, such as the trunk lid. In the simplest case, the method is started in the first place by actuating the switch, in which method the mobile identification transmitter is sought or detected at a position around the vehicle, and/or in which method a duration of the stay of the mobile identification transmitter or the output of a user signal is carried out. However, it is also conceivable to start the method for controlling a locking element as described above, but only to check whether the switch has been actuated by a user prior to a step of closing and/or locking the at least one locking element (after the mobile identification transmitter continues to stay at the position for a second predetermined duration after the output of the user signal). Instead of or in addition to an actuation of a mechanical switch, it is however also conceivable to also set up a corresponding setting for an automatic closing and/or locking by means of a "virtual" switch, such as by means of a corresponding setting on a user interface on a display device in the vehicle.

With reference to an automatic closing/locking, it is further conceivable, after successful closing and/or locking, to output a further user signal to the user, so that the user is informed about the successful information and can walk away from the vehicle in a correspondingly reassured manner. Furthermore, a simplified automatic closing/locking of at least one locking element is possible, in which initially a mobile identification transmitter is detected at a position in a certain access region around the vehicle, and then (without the intermediate step of outputting a user signal) the at least one locking element is automatically closed and/or locked after the mobile identification transmitter stays at the position for a certain duration after detection at the position.

Figure 3:
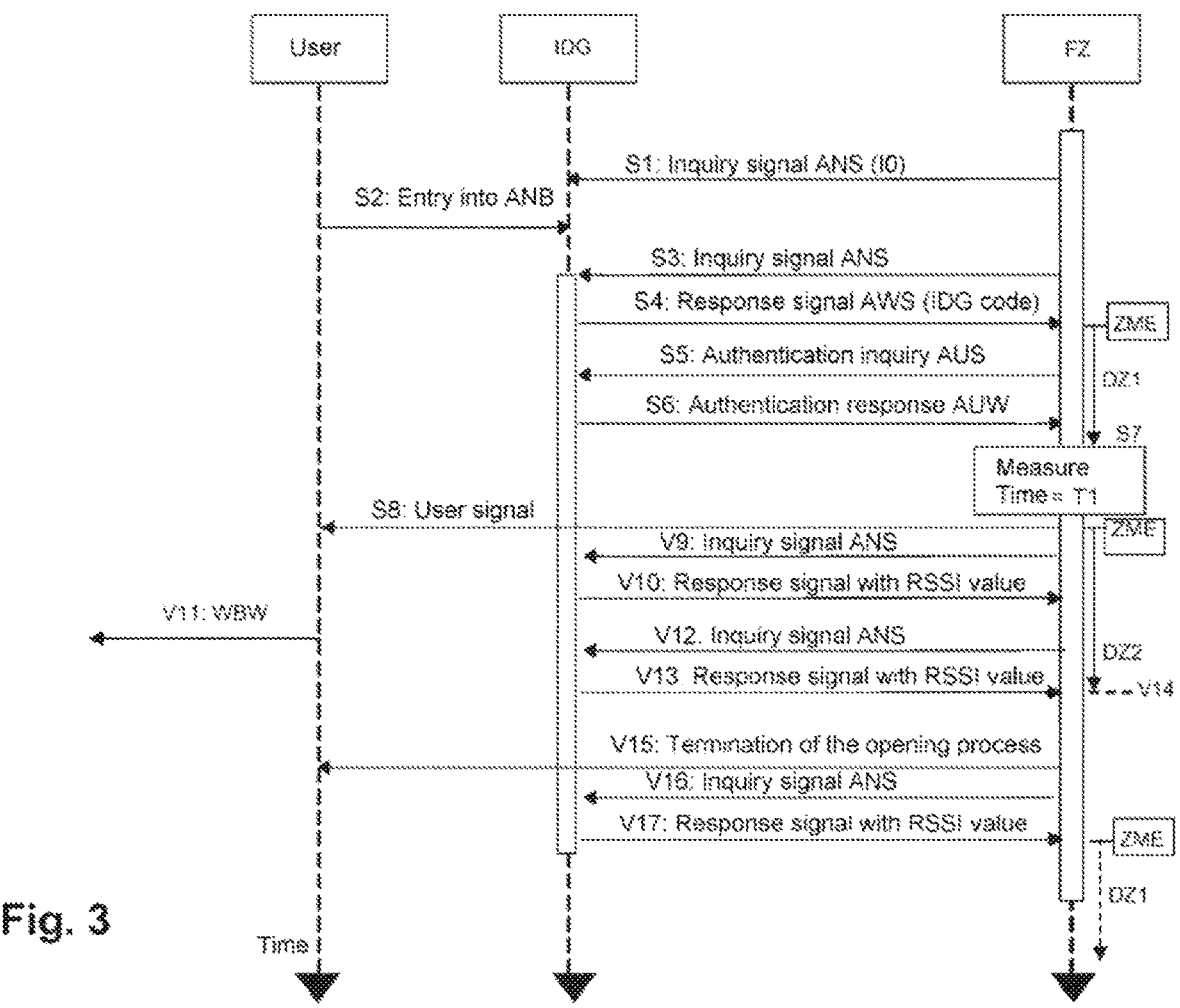
FIG. 3 shows a flow chart for illustrating the operation of an access arrangement for the control of at least one locking element in the form of a vehicle door with termination of the automatic opening and unlocking process according to an embodiment of the invention.
Figure 6:
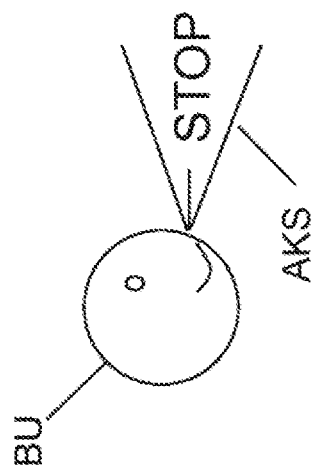
FIG. 6 shows a schematic illustration of a third possible termination signal of a user according to a configuration.

Now, finally, reference is made to FIG. 3, in which a flow chart for the detailed illustration of the operation of the access arrangement ZA for unlocking or opening of the vehicle door TFZ (actually the trunk lid) is shown, with the application of a targeted termination on the part of the user. In particular, the steps S1 to S8 in this case correspond to the steps of the embodiment which is illustrated in FIG. 2, and is illustrated in a somewhat shorter manner in the following. Again, it is assumed that the vehicle FZ is in a switched-off or parked state. Accordingly, according to step S1, inquiry signals ANS are again sent out at regular intervals or at certain times at a certain field strength I0.

Initially, it is assumed that the mobile identification transmitter IDG is still located at the position POS1 (outside the proximity region ANB).

Then the user with their mobile identification transmitter IDG moves along the arrow P1 (FIG. 1) toward the vehicle FZ, advances in step S2 into the proximity region ANB and stops there at the position POS2 in the access region ZGB.

If a further inquiry signal ANS is then sent out in step S3 by the vehicle FZ or the vehicle-side transmitting/receiving device SE via the antenna ANF, then the mobile identification transmitter IDG can receive this signal and will send back a corresponding response signal AWS in step S4 (as already described for FIG. 2).

Then a thorough authentication again begins in step S5, in which the vehicle FZ transmits an authentication inquiry AUS to the mobile identification transmitter IDG. In step S6, the mobile identification transmitter IDG responds with a response signal AUW including the authentication code.

If the authentication code is correct, then the transmitting/receiving device SE will emit further inquiry signals ANS with a predetermined field strength I0 via the antenna ANF at regular time intervals, for the purpose of position determination.

As can be seen in FIG. 3, a time-measuring device ZME of the vehicle begins the measurement of a duration DZ1 from the arrival of the response signal AWS with the identification-transmitter-side code according to step S4. This time measurement again runs parallel to the following just illustrated steps S5 and S6 and during the regular sending out of inquiry signals ANS and the receipt of response signals for a position determination of the mobile identification transmitter IDG. If no movement of the identification transmitter IDG is detected since the time of the arrival of the response signal AWS according to step S4, then it is possible to conclude that the identification transmitter is standing still or staying at the position thereof, particularly at the position POS2 inside the access region.

If, firstly, the vehicle-side control device STE determines that the mobile identification transmitter has already stayed for a longer time at the position POS2, then it will check in step S7 whether this duration of stay has already lasted for a first predetermined duration T1.

If this is the case, then according to step S8, a user signal is output on the part of the vehicle, triggered by the vehicle-side control device STE.

With triggering of the user signal (the double flashing DBL), firstly the time-measuring device ZME is activated again to measure a further time interval DZ2. In addition, the transmitting/receiving device SE is again caused to send out inquiry signals ANS at regular time intervals according to steps V9 and V12, the RSSI value of which is then determined in the mobile identification transmitter IDG and, according to steps V10 and V13, sent back to the vehicle FZ again. In this manner, it is possible to check the position of the mobile identification transmitter at predetermined time intervals and a movement of the identification transmitter can be determined.

According to the example of FIG. 2, it is then assumed that the mobile identification transmitter IDG initially does not move after the output of the user signal, which is also determined by the position determination according to steps V9 and V10.

Meanwhile, the user has recognized that the automatic unlocking/opening process (as described in fig.) is ongoing and has come to the decision that they would not like to have this. They therefore consciously decide to terminate the same. According to the embodiment illustrated in FIG. 3 for controlling the locking element in the form of the trunk lid, the user can output a predetermined termination signal to achieve a termination. According to FIG. 3, this may consist in the user moving away from their current position POS2 within the second predetermined duration T2 (see also FIG. 2). Accordingly, the user then moves according to step V11 from the position POS2 to position POS3 inside the access region ZGB (a movement to position POS4 would also be possible).

This movement away WBW is then determined by means of the position determination according to steps V12 and V13. The vehicle-side control device STE correspondingly has knowledge of the movement away, and will pick up the information from the time-measuring device as to whether the movement away has also taken place during the measurement of the time interval DZ2 and thus prior to the elapse of the second predetermined duration T2.

In the present case, the vehicle-side control device STE determines that the movement away has again taken place prior to the elapse of the second predetermined duration T2, and evaluates this as the termination signal intended by the user. According to step V14, it then stops the time-measuring device and further, in step V15, the process of unlocking/opening the vehicle door or trunk lid is terminated.

After the termination of the process of unlocking/opening, the vehicle will again begin, by means of the transmitting/receiving device, to search for the mobile identification transmitter and, if possible, to determine the location thereof. This takes place in the above-presented manner by sending out an inquiry signal ANS and receiving a response signal including RSSI value according to steps V16 and V17.

If, in this case, the mobile identification transmitter IDG is still located within the access region ZGB, for example at the position POS3, then the control device STE will in turn activate the time-measuring device ZMA to start a time measurement (of a time interval DZ1) (according to the arrival of the response signal AWS with the identification-transmitter-side code according to step S4). In principle, the procedure can then continue to be carried out from step S5 as according to the illustration in the flowcharts of FIG. 2 and FIG. 3, wherein it is optional to also carry out the authentication process again.

According to the embodiment of FIG. 3, in addition to the pure distance or location determination, the transmitting/receiving device SE therefore also takes on the function for detecting the termination signal, and can in this case also be seen as a part of a detection device EFE, which may comprise further detection components.

These further detection components may for example be a camera KA for detecting images of scenery around the vehicle. Accordingly, a termination signal of the user can be determined by means of the camera KA, for which the user moves away from their previous position (such as in the example of FIG. 3), or moves a certain body part in a certain manner.

Thus, for example according to the illustration of FIG. 4, it is possible to detect by means of the camera KA whether the user BU moves their head KO to the left according to the arrow KD1 and back again to the right according to the arrow KD2. This movement pattern of the head of the user may be defined as a termination signal of the user.

Figure 5:
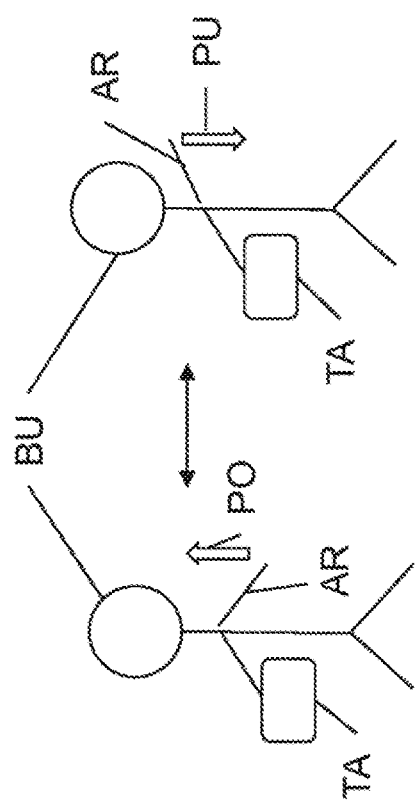
FIG. 5 shows a schematic illustration of a second possible termination signal of a user according to a configuration.

Accordingly, according to the illustration of FIG. 5, it is possible to detect by means of the camera KA whether the user BU, who is carrying one or more bags TA in one hand, moves an arm AR upward according to the arrow PO and back downward again according to the arrow PU. This movement pattern of the arm of the user may be defined as a termination signal of the user.

Furthermore, a microphone MI for detecting acoustic signals of the user may be provided as further detection component. For example, responding to the user signal, the user may express a clearly understandable word "STOP" for the vehicle, in order to output a termination signal.

In this case, it is conceivable to permit a certain termination signal or a multiplicity of (e.g. of the above-mentioned) termination signals on the part of the vehicle-side control device for a termination of the unlocking/opening process. It is also conceivable to define a certain combination of termination signals for a termination.

It is mentioned in turn that the method described with reference to FIG. 3 for terminating an unlocking/opening of a locking element can also be applied for an above-mentioned closing/locking (instead of the unlocking/opening).

The invention claimed is:

1. A method for controlling at least one locking element of a vehicle, comprising:
    a) detecting a mobile identification transmitter at a position in a certain access region around the vehicle;
    b) outputting a user signal to a user carrying the mobile identification transmitter after the mobile identification transmitter has stayed at the position for a first predetermined duration;
    c) unlocking or opening the at least one locking element after the mobile identification transmitter further stays at the position for a second predetermined duration after the user signal is output;
    d) terminating the unlocking or opening if a termination signal from the user is detected within the second predetermined duration, wherein the termination signal of the user comprises a predetermined movement of a body part, and the predetermined movement of a body part comprises a head movement of the user.

2. The method as claimed in claim 1, wherein the location of the mobile identification transmitter with respect to the vehicle is determined after a termination of the unlocking or opening.

3. The method as claimed in claim 2, wherein, in the event that the location of the mobile identification transmitter is furthermore determined in the certain access region at a position, after the termination of the unlocking or opening, the method is continued again with outputting a user signal to a user carrying the mobile identification transmitter after the mobile identification transmitter has stayed at the position for a first predetermined duration.

4. The method as claimed in claim 2, wherein the method is continued again with outputting a user signal to a user carrying the mobile identification transmitter after the mobile identification transmitter has stayed at the position for a first predetermined duration after the location of the mobile identification transmitter was detected initially outside and then inside the certain access region.

5. The method as claimed in claim 1, wherein the termination signal of the user comprises a movement away from the position inside the certain access region.

6. The method as claimed in claim 1, wherein the predetermined movement of the body part comprises a hand movement or an arm movement, and the head movement comprises at least one head rotation to at least one of left and right, of the user.

7. The method as claimed in claim 1, wherein the termination signal of the user comprises an acoustic signal of the user.

8. The method as claimed in claim 1, wherein an authentication of the mobile identification transmitter is carried out at the vehicle, in order to check that the mobile identification transmitter belongs to the vehicle.

9. The method for controlling at least one locking element of a vehicle, as claimed in claim 1 wherein the termination signal comprises a biometric signal.

10. The method as claimed in claim 1, wherein the termination signal of the user comprises a predetermined frequency profile or speech profile.

11. The method as claimed in claim 10, wherein the frequency profile or speech profile of the user is analyzed prior to being used as a termination signal.

12. A method for controlling at least one locking element of a vehicle, comprising:
    A) detecting a mobile identification transmitter at a position in a certain access region around the vehicle;
    B) outputting a user signal to a user carrying the mobile identification transmitter after the mobile identification transmitter has stayed at the position for a first predetermined duration;
    C) closing or locking the at least one locking element after the mobile identification transmitter further stays at the position for a second predetermined duration after the user signal is output;
    D) terminating the closing or locking if a termination signal from the user is detected within the second predetermined duration, wherein the termination signal of the user comprises a predetermined movement of a body part, and the predetermined movement of a body part comprises a head movement of the user.

13. The method for controlling at least one locking element of a vehicle, as claimed in claim 12 wherein the termination signal comprises a biometric signal.

14. The method as claimed in claim 12, wherein, prior to the step of closing or locking the at least one locking element, a user further actuates a switch at the vehicle which enables the closing or locking.

15. An access arrangement for a vehicle, comprising:
    i) a location device for detecting a mobile identification transmitter at a position in a certain access region around the vehicle;
    ii) an output device for outputting a user signal to a user carrying the mobile identification transmitter after the mobile identification transmitter has stayed at the position for a first predetermined duration;
    iii) a control device for unlocking or opening the at least one locking element after the mobile identification transmitter further stays at the position for a second predetermined duration after the user signal is output;
    iv) a detection device for detecting a termination signal of a user, wherein the termination signal of the user comprises a predetermined movement of a body part, and the predetermined movement of a body part comprises a head movement of the user;
    v) wherein the control device is further set up to terminate the unlocking or opening if a termination signal from the user is detected within the second duration.

16. The access arrangement as claimed in claim 15, wherein the detection device has a movement detection device for detecting a movement away of the user from the position.

17. The access arrangement as claimed in claim 16, wherein the movement detection device comprises a camera.

18. The access arrangement as claimed in claim 15, wherein the detection device comprises a microphone for detecting an acoustic signal of the user as a termination signal.

19. The access arrangement as claimed in claim 15 wherein the access arrangement is comprised in the vehicle and the vehicle is the motor vehicle.

20. The access arrangement as claimed in claim 15 wherein the termination signal comprises a biometric signal.

* * * * *